United States Patent [19]

Colon

[11] Patent Number: 4,496,700

[45] Date of Patent: Jan. 29, 1985

[54] POLYMERIZATION OF HALOALKYNES BY A NICKEL CATALYST

[75] Inventor: Ismael Colon, Piscataway, N.J.

[73] Assignee: Union Carbide Corporation, Danbury, Conn.

[21] Appl. No.: 521,452

[22] Filed: Aug. 8, 1983

[51] Int. Cl.$^3$ .............................. C08F 4/44; C08F 4/72
[52] U.S. Cl. .................................... 526/111; 526/139; 526/141; 526/285; 526/291; 526/294
[58] Field of Search ............... 526/139, 285, 294, 291, 526/111, 141

[56] References Cited

U.S. PATENT DOCUMENTS

| | | | |
|---|---|---|---|
| 1,828,560 | 10/1931 | de Liefde | 526/285 X |
| 2,961,330 | 11/1960 | Meriwether | 106/285 |
| 3,051,694 | 8/1962 | Meriwether et al. | 260/94.1 |
| 3,474,012 | 10/1969 | Kornicker | 526/285 X |
| 3,658,942 | 4/1972 | Kargin et al. | 260/875 |
| 4,070,333 | 1/1978 | Jabloner | 260/42.18 |
| 4,263,466 | 4/1981 | Colon et al. | 585/421 |
| 4,326,989 | 4/1982 | Colon et al. | 252/429 R |
| 4,349,664 | 9/1982 | Matsumura et al. | 528/491 |

FOREIGN PATENT DOCUMENTS 1021948  3/1966  United Kingdom .

Primary Examiner—Joseph L. Schofer
Assistant Examiner—S. Babajko
Attorney, Agent, or Firm—Bernard Francis Crowe

[57] ABSTRACT

Haloalkynes are polymerized to polyunsaturated compounds with a catalyst mixture consisting of a nickel compound, and a ligand in the presence of a reducing metal.

11 Claims, No Drawings

POLYMERIZATION OF HALOALKYNES BY A NICKEL CATALYST

BACKGROUND OF THE INVENTION

This invention pertains to the polymerization of haloalkynes and in particular to the formation of highly conjugated, polyunsaturated polymeric materials.

There is a continuing search for highly conjugated, polyunsaturated synthetic organic polymers for use in the area of electrically conducting polymers and in the coatings industry. Polyacetylene is a material which has attracted a great deal of attention because it can be doped to produce electrically conducting polymers. Materials of this kind have found applications in the electronics industry as electrodes or components of batteries and also as light-weight wiring. However, one of the drawbacks of polyacetylene is that it is insoluble in water and organic solvents and thus cannot be readily fabricated into shaped articles and forms. This property of polyacetylene renders it equally undesirable as a coating material.

It is, therefore, an object of this invention to provide a means of producing highly conjugated polymers which are soluble and have the potential to become electrically conducting by treating these materials with dopants.

It is another object to provide highly conjugated, polyunsaturated organic polymers which can be easily crosslinked to serve as durable coating materials.

It is known in the prior art that nickel triaryl phosphine complexes can polymerize acetylenes, but there are a number of limitations imposed by previous methods. In a number of cases using catalyst systems comprising reduced nickel triaryl phosphine complexes, only low molecular weight polymers were obtained. Thus, in U.S. Pat. No. 2,961,330 the products are described as liquid materials with one to about 6 repeating units. Another limitation disclosed in the latter patent is the fact that disubstituted acetylenes do not react. When costly reducing agents were avoided and simple complexes of nickel halides were used (as in British No. 1,021,948), then relatively large ratios of catalyst to alkyne had to be used.

U.S. Pat. Nos. 4,263,466 and 4,326,989 disclose a process and a catalyst composition for the coupling of aryl monochlorides. It would be unexpected, therefore, that the catalyst composition disclosed in these patents would allow halo alkynes to be polymerized without any of the above-mentioned limitations.

SUMMARY OF THE INVENTION

A method has been discovered to synthesize highly conjugated, polyunsaturated organic polymers which comprises contacting a haloalkyne, having 3 to about 18 carbon atoms where the halogen constituent can be Cl, Br or I, with a catalyst mixture in the presence of a reducing metal selected from the group consisting of zinc, magnesium, and manganese or mixtures thereof in a dipolar aprotic solvent in which said haloalkyne is soluble, under essentially anhydrous conditions for a period of time and at a temperature sufficient to couple said haloalkyne until normally solid macromolecules are produced, wherein the catalyst mixture comprises an anhydrous nickel compound and at least one ligand selected from the group consisting of a triarylphosphine having from about 6 to about 14 carbon atoms in each aryl moiety and an aromatic bidentate compound containing at least one ring nitrogen atom and from about 5 to about 30 carbon atoms and wherein the ratio of gram atoms of nickel per mole of haloalkyne is from about 0.001 to about 0.01, the amount of ligand is from about 1 to about 50 moles per gram atom of nickel and the amount of reducing metal is at least about 0.5 mole of reducing metal per mole of haloalkyne.

The polyunsaturated organic polymers thus produced can be converted to doped polyunsaturated organic polymers by contacting them with known dopants. These doped polymers can be used as organic semiconductors in solar batteries, sensors, and the like.

The electrical conductivity of the polyunsaturated organic polymers thus produced can be enhanced by doping them with known dopants, such as, HBr, $Cl_2$, $Br_2$, $I_2$, ICl, IBr, $AsF_5$, Na, $AgBF_4$, $AgClO_4$, or $FSO_2OOSO_2F$. One may also use platinum group metal complexes, such as, $(PhCN)_2 PdCl_2$, $(COD)PdCl_2$, $[(C_2H_4)PdCl_2]_2$, $(Ph_4C_4)PdCl_2$, $(COD)PtCl_2$, $K[PtCl_3(C_2H_4)]H_2O$, $[Pt(C_2H_4)Cl_2]_2$, $(PhCN)_2PtCl_2$, $[(C_2H_4)_2 RhCl]_2$, and $Ru(COD)Cl_2$, wherein COD represents 1,5-cyclooctadiene and $Ph_4C_4$ represents tetraphenylcyclobutadiene; carbonium salts and oxonium salts including onium salts consisting of combinations of the following cations and ions;

CATIONS

Triphenylmethyl ion $[(C_6H_5)_3C^+]$ tropylium ion $(C_7H_7^+)$, acyl ion $(RCO^+)$, dialkoxycarbonium ion $[RC(OR')(OR'')^+]$ and triethyloxonium ion $[(C_2H_5)_3O+]$, wherein R, R' and R" are alkyl, aryl, or aralkyl.

ANIONS $BF_4^-$, $AlCl_4^-$, $FeCl_4^-$, $SnCl_5^-$, $PCl_6^-$, $SbCl_6^-$, $SbF_6^-$, $ClO_4^-$, $CF_3SO_3^-$ and $CF_3CO_2^-$, and parabenzoquinone derivatives, such as, 2,3-dicyano-5-chloroparabenzoquinone, 2,3-dichloro-5,6-dicyanoparabenzoquinone, 2,3-cicyano-5-phenylsulphonylparabenzoquinone, 2,3-dicyano-5-chloro-6-phenylsulphonylparabenzoquinone and 2,3,5,6-tetracyanoparabenzoquinone.

DESCRIPTION OF THE INVENTION

Suitable haloalkynes for use in this invention include alkyne substituted chloro, bromo, and iodo compounds. However, the chloroalkynes are the preferred haloalkynes.

Exemplary haloalkynes include:
propargyl chloride
1,4-dichloro-2-butyne
5-chloro-1-pentyne
4-chloro-3-methylbutyne-1
6-chlorohexyne-1
6-chlorohexyne-2
6-chlorohexyne-3
4-chloro-3,3-dimethylbutyne-1
18-chloro-1-octadecyne,
and the like.

The catalyst compositions comprise an anhydrous nickel compound and at least one ligand selected from the group consisting of a triaryl phosphine having 6 to about 14 carbons in each aryl moiety and an aromatic bidentate compound containing at least one ring nitrogen atom and about 5 to about 30 carbon atoms, a metal selected from zinc, magnesium or manganese, and a promoter selected from alkali, alkaline earth, zinc, magnesium, manganese and aluminum halides, sulfates or phosphates, wherein the amount of ligand is from about 0.1 to about 100 moles per gram atom of nickel, the amount of zinc, magnesium or manganese is at least about 1 gram atom per gram atom of nickel, and the amount of promoter is at least 0.1 mole per gram atom of nickel.

The polymerization reaction takes place at temperatures of from about $-30°$ to about 250° C., preferably from about 0° to about 100° C., and most preferably, from about 25° to about 80° C.

Pressure is not critical and so superatmospheric or subatmospheric pressures can be used as well as atmospheric pressure. Reaction is carried out in an inert atmosphere.

Reaction time is not narrowly critical since high polymer yields are often obtained in less than 4 hours. Inorganic salt promoters may be used to significantly increase the reaction rate. There are no maximum times since the reaction is essentially irreversible, but with certain reactants, such as 1,4-dichloro-2-butyne, long reaction times may cause the reaction mixture to gel.

Preferred promoters include alkali, alkaline earth, zinc, magnesium, manganese and aluminum halides, or mixtures thereof. Iodides are particularly preferred. The amount of promoter, when used, can range from about 0.1 to about 1000 moles per gram atom of nickel with about 1 to about 100 moles of promoter being preferred. If desired, one can also employ alkali, alkaline earth, zinc, magnesium, manganese, and aluminum sulfates or phosphates, or mixtures thereof as promoters.

Suitable nickel compounds are those reducible by organometallic and metal reducing agents. These compounds include nickel halides, that is, the chlorides, bromides and iodides, nickel sulfates, nickel phosphates, nickel carbonates, nickel salts of organic acids having 1 to 18 carbons, such as, nickel formate, nickel acetate, and nickel organic complexes such as nickel acetylacetone, dichlorobis(triphenylphosphine) nickel (II) and the like: and nickel (0) compounds such as bis(1,5-cyclooctadiene) nickel, tetrakis(triphenylphosphine) nickel, and the like. The anion of the nickel compounds is unimportant and serves merely to provide nickel ion to the catalyst mixture, but it must not interfere with the reaction of the nickel compound with the ligand. The preferred anions are the halides.

Suitable triaryl phosphines include triphenylphosphine, triphenylphosphines containing alkyl or alkoxy substituents having up to about 8 carbon atoms, and unsubstituted or alkyl- and alkoxy-substituted trinapthyl phosphines. Suitable bidentate compounds include 2,2'-bipyridyl, 1,10-phenanthroline, 1,8-naphthyridine, 2-methylaminopyridine, and the like.

Preferred aprotic solvents include dipolar solvents, such as dimethylacetamide, dimethylformamide, dimethylsulfoxide, sulfolane, and the like. If desired, these aprotic solvents can be mixed with lower polarity inert solvents, such as saturated aliphatic hydrocarbons, including pentanes, hexanes, dodecanes, and the like; aromatic hydrocarbons, such as, benzene, toluene, xylenes and the like; and saturated aliphatic and cycloaliphatic ethers, such as, diethyl ether, diglyme, tetrahydrofuran, and the like.

It is preferred that all solvents used in the practice of this invention be anhydrous.

Although magnesium and manganese metals can be used, zinc metal is the preferred metal in the process for polymerizing haloalkynes. It is also preferred that the metal be in finely divided form with an average sieve size of 20 or finer when measured on the U.S. sieve scale.

While not wishing to be bound by any particular theoretical explanation, it is believed that the practice of this invention leads to high polymers because polymerization is effected through the reaction of carbon-halogen bonds as well as through the reaction of the triple bond of the alkyne.

The invention is further described in the examples which follow. All parts and percentages are by weight unless otherwise specified.

EXAMPLE 1

In a 100 ml two-neck flask equipped with a magnetic stirring bar, serum cap and stopcock adapter were placed 0.05 g (0.385 mm) $NiCl_2$, 0.06 g (0.583 mm) NaBr, 3.0 g (11.45 mm) triphenylphosphine, and 6.0 g (91.8 mm) zinc dust. The flask was evacuated and filled with nitrogen several times by connecting the stopcock adapter on the flask to a double-manifold vacuum line. Thirty ml of dry N,N-dimethyl acetamide (DMAC) was added to the catalyst mixture via syringe through the serum cap, and the reaction flask was placed into an oil bath at 40° C. The mixture was stirred magnetically, and within 10 minutes the red-brown catalyst had formed. Five ml (51.15 mm) of 1,4-dichloro-2-butyne was added via syringe to the reaction mixture. The solution turned gray on the addition of the monomer but was red again within several minutes. The reaction temperature was increased slowly over a period of several hours to 70°. The reaction was allowed to continue for 16 hours during which time the reaction mixture gelled. The gel was placed in a blender along with 150 ml of methanol, and the resulting light brown powder was collected by filtration. Upon extended exposure to air, the solid became very dark and glassy.

EXAMPLE 2

A 100 ml two-neck flask, equipped as in example number one, was charged with 0.13 g (1.0 mm) $NiCl_2$, 4.0 g (15.3 mm) triphenylphosphine, 0.50 g (4.9 mm) NaBr, and 8.0 g (122 mm) Zn. Once under an inert atmosphere (nitrogen) 40 ml of dry DMAC was added to the catalyst mixture. The reaction flask was then placed in an oil bath at 60°. The reaction mixture was stirred magnetically and after 45 minutes 10 ml (102 mm) 1,4-dichloro-2-butyne was added. The mixture was reacted at 60° for 3 hours, was filtered under nitrogen, and the filtrate was coagulated in methanol. The brown polymer was dried under a stream of nitrogen. The polymer was soluble in DMAC and a film could be cast from solution. On exposure to air, the film darkened and became insoluble in the casting solvent.

EXAMPLE 3

In the same reaction apparatus as described in Examples 1 and 2 and to the same catalyst mixture as described in Example 2, was added 10 ml (138 mm) propargyl chloride. The reaction was allowed to continue for 4 hours at 60°, was filtered under nitrogen, and the filtrate was coagulated in methanol. The light brown polymer was dried under vacuum at room temperature, and was stored under nitrogen in an Airlessware storage flask. When exposed to air, the material became very dark and insoluble in all common solvents. The IR spectrum of the polymer is dominated by bands due to conjugated unsaturation (1605 $cm^{-1}$), methylene adjacent to unsaturation (1435 cm$^{+1}$), and terminal olefin (1105 cm$^{-1}$) In addition, a number of weaker bands due to a variety of unsaturated species are observed, including isolated olefin (3055, 3025, 3010, 1640, 1405, 998 and 890 cm$^{-1}$), alkyne (330, 2215, and 2115 cm$^{-1}$) and allene (1955 and 845 cm$^{-1}$) species. Aliphatic methylene species result in bands at 2920, 2855, 750, and 720 cm$^{-1}$.

Although the invention has been described in its preferred forms with a certain degree of particularity, it is understood that the present disclosure has been made only by way of example and that numerous changes can be made without departing from the spirit and the scope of the invention.

I claim:

1. Method of synthesizing highly conjugated, polyunsaturated organic polymers which consists essentially of contacting a haloalkyne having 3 to about 18 carbon atoms where the halogen constituent can be Cl, Br or I with a catalyst mixture in the presence of a reducing metal selected from the group consisting of zinc, magnesium and manganese or mixtures thereof in a dipolar aprotic solvent in which said haloalkyne is soluble, under essentially anhydrous conditions for a period of time and at a temperature sufficient to couple said haloalkyne until normally solid macromolecules are produced, wherein the catalyst mixture comprises an anhydrous nickel compound and at least one ligand selected from the group consisting of a triarylphosphine having from about 6 to about 14 carbon atoms in each aryl moiety and an aromatic bidentate compound containing at least one ring nitrogen atom and from about 5 to about 30 carbon atoms and wherein the ratio of gram atoms of nickel per mole of haloalkyne is from about 0.001 to about 0.01, the amount of ligand is from about 1 to about 50 moles per gram atom of nickel and the amount of reducing metal is at least about 0.5 mole of reducing metal per mole of haloalkyne.

2. Method claimed in claim 1 wherein the haloalkyne is a chloroalkyne.

3. Method claimed in claim 2 wherein the haloalkyne is propargyl chloride.

4. Method claimed in claim 2 wherein the haloalkyne is 1,4-dichloro-2-butyne.

5. Method claimed in claim 2 wherein the haloalkyne is 5-chloro-1-pentyne.

6. Method claimed in claim 2 wherein the haloalkyne is 4-chloro-3-methylbutyne-1.

7. Method claimed in claim 2 wherein the haloalkyne is 6-chlorohexyne-1.

8. Method claimed in claim 2 wherein the haloalkyne is 6-chlorohexyne-2.

9. Method claimed in claim 2 wherein the haloalkyne is 6-chlorohexyne-3.

10. Method claimed in claim 2 wherein the haloalkyne is 4-chloro-3,3-dimethylbutyne-1.

11. Method claimed in claim 2 wherein the haloalkyne is 18-chloro-1-octadecyne.

* * * * *